United States Patent
Hong et al.

(10) Patent No.: US 9,459,121 B2
(45) Date of Patent: Oct. 4, 2016

(54) ANGLE MEASURING DEVICE AND METHODS FOR CALIBRATION

(71) Applicant: DigiPas USA, LLC, Avon, CT (US)

(72) Inventors: Jim Li Hui Hong, Singapore (SG); Kuu Bi Yong, Singapore (SG)

(73) Assignee: DigiPas USA, LLC, Avon, CT (US)

( * ) Notice: Subject to any disclaimer, the term of this patent is extended or adjusted under 35 U.S.C. 154(b) by 644 days.

(21) Appl. No.: 13/899,266

(22) Filed: May 21, 2013

(65) Prior Publication Data

US 2014/0350881 A1    Nov. 27, 2014

(51) Int. Cl.
    *G01C 25/00*    (2006.01)

(52) U.S. Cl.
    CPC .................. *G01C 25/005* (2013.01)

(58) Field of Classification Search
    CPC .... G01B 5/008; G01B 21/04; G01B 11/005; G01B 21/042; G01B 7/008; G01B 21/047; G01B 11/26; G01B 5/012; G01B 11/007; G01B 2210/58; G01B 5/004; G01B 5/24
    USPC .............................................. 33/366.12, 534
    See application file for complete search history.

(56) References Cited

U.S. PATENT DOCUMENTS

| | | | | |
|---|---|---|---|---|
| 4,625,423 A * | 12/1986 | Sackett | .................... | G01C 9/06 33/366.16 |
| 4,819,195 A * | 4/1989 | Bell | .................... | G01B 21/045 33/503 |
| 4,945,501 A * | 7/1990 | Bell | .................... | G01B 21/045 33/503 |
| 5,239,855 A | 8/1993 | Schleifer et al. | | |
| 5,313,713 A * | 5/1994 | Heger | .................... | G01C 9/20 33/343 |
| 5,525,901 A * | 6/1996 | Clymer | .................. | G01R 33/09 33/355 R |
| 5,841,668 A * | 11/1998 | Pahk | .................... | G05B 19/404 33/503 |
| 6,152,403 A | 11/2000 | Fowell et al. | | |
| 6,308,134 B1 | 10/2001 | Croyle et al. | | |
| 6,532,419 B1 | 3/2003 | Begin et al. | | |
| 6,651,003 B2 | 11/2003 | Woloszyk et al. | | |
| 6,715,213 B2 * | 4/2004 | Richter | .................. | G01B 11/26 33/275 G |
| 6,792,382 B2 * | 9/2004 | Kunitomo | ................ | G01C 9/06 33/312 |
| 6,871,413 B1 * | 3/2005 | Arms | .................... | A61B 5/1071 33/1 PT |
| 6,925,850 B2 | 8/2005 | Comer et al. | | |
| 7,350,303 B2 * | 4/2008 | Rock | ........................ | G01C 1/00 33/318 |
| 7,389,591 B2 * | 6/2008 | Jaiswal | ................. | G06F 1/1626 33/366.11 |
| 7,451,549 B1 * | 11/2008 | Sodhi | ..................... | G01C 17/38 33/356 |
| 7,550,965 B2 | 6/2009 | Miller | | |
| 7,743,520 B1 * | 6/2010 | Jiorle | ....................... | G01C 9/28 33/366.11 |
| 8,289,528 B2 | 10/2012 | Westermark | | |
| 8,297,103 B2 | 10/2012 | Valasek et al. | | |

(Continued)

FOREIGN PATENT DOCUMENTS

| WO | 93/05360 A1 | 3/1993 |
|---|---|---|
| WO | 96/04524 A1 | 2/1996 |

(Continued)

*Primary Examiner* — Yaritza Guadalupe-McCall (74) *Attorney, Agent, or Firm* — McCormick, Paulding & Huber LLP (57) ABSTRACT

The invention relates to a method for calibration of 2-axis high precision digital angle measurement device, particularly for initializing a planar angle measuring device and an apparatus to generate simultaneous two-dimensional resultant planar angles of full 360° rotation. The planar angle measurement device is, typically but not exclusively, used in concurrent two-dimensional angles leveling, setting and alignment tasks for precision machine setup in the fields of precision engineering and metrology applications.

20 Claims, 6 Drawing Sheets

(56) References Cited

U.S. PATENT DOCUMENTS

| | | | | |
|---|---|---|---|---|
| 9,199,825 B2* | 12/2015 | Dueckman | ............... | B66C 13/40 |
| 2007/0006472 A1* | 1/2007 | Bauch | ................... | G01C 21/165 |
| | | | | 33/355 R |
| 2007/0209223 A1* | 9/2007 | Frank | ........................ | G01C 9/06 |
| | | | | 33/530 |
| 2009/0038168 A1* | 2/2009 | Wixey | ...................... | B43L 7/10 |
| | | | | 33/471 |
| 2010/0229410 A1* | 9/2010 | Schubert | ................... | G01C 9/06 |
| | | | | 33/366.27 |
| 2010/0275456 A1* | 11/2010 | Lord | ........................ | G01B 3/11 |
| | | | | 33/706 |
| 2011/0197651 A1* | 8/2011 | Wixey | ...................... | G01C 9/06 |
| | | | | 33/366.27 |
| 2011/0302796 A1* | 12/2011 | Schubert | ................... | G01C 9/06 |
| | | | | 33/366.11 |
| 2014/0237837 A1* | 8/2014 | Wixey | ...................... | G01B 5/24 |
| | | | | 33/534 |

FOREIGN PATENT DOCUMENTS

| | | |
|---|---|---|
| WO | 01/92825 A1 | 12/2001 |
| WO | 2005/071690 A1 | 8/2005 |
| WO | 2008/105984 A2 | 9/2008 |
| WO | 2011/089236 A1 | 7/2011 |
| WO | 2011/136848 A1 | 11/2011 |

* cited by examiner

ANGLE MEASURING DEVICE AND METHODS FOR CALIBRATION

BACKGROUND OF INVENTION

1. Field of Invention

This invention concerns leveling and angle measuring devices, apparatus and methods for calibration.

2. Description of Prior Art

Traditional precision machining utilizing turning lathe, drilling and milling machines were typically operated by skilled machinist through precise adjusting each X, Y and Z axis to complete a machining component or part. These skilled-labor dependent machines has been radically replaced by very high precision, augmented machining speed, multiple axis, fully automatic computer numerical control (CNC) machines. These programmable CNC machines are capable of non-stop running in production lines integrated with automatic robotic manipulators for material input and removing the machined part.

Driven by automobile, semiconductor and clean energy of precision engineering industries, the demand for tighter tolerance machining part—higher precision), High speed machining—vibration becomes important issue affecting machine's accuracy, High volume machining and complex machined part—production yield significantly affecting cost and delivery lead time, Larger size of machined part and harder materials, have emerged as critical variables influencing these advanced CNC machines accuracy performance and machine—part production yield requirements.

In contrast, machine leveling and alignment instrument used for manufacturing, installation, set up and maintenance of these advanced CNC machines and metrology equipment remains relatively unchanged. Machinists are still using the traditional single-axis 'bubble' spirit level or conventional single-axis digital leveling instrument to perform machine leveling tasks which are unarguably ineffective—time consuming, skilled-operator dependent, and difficult to verify machine leveling status when machine setup activity completed.

Current drawbacks associated with using conventional single-axis leveling devices to align precision machines in attaining positional stability and precise leveled state are as follows:

First, the task confronted by the machine operator for leveling a machine is a two-dimensional planar surface alignment issue. In contrast, traditional leveling and angle measuring instruments are single axis or one directional. Machine leveling operator is required to adjust a machine-frame footings one axis at a time. Since aligning a machine structure involves planar surface, adjusting one axis of the machine affect the other axis of existing plane. Thus, the operator has to do trial-and-error by going back-and-forth in adjusting each footing until the machine surface plane (i.e. where the leveling instrument is placed) is completely leveled. This is a tedious, time consuming and nonproductive task, yet critical affecting machine accuracy and yield performance. The operator could potentially resort to compromise in facing such lengthy repetitive task of iteration.

Second, leveling a machine using traditional spirit level or digital level typically requires two operators. One operator looks at the instrument for current leveling status while the other operator adjusting at the machine footings one at a time. Prolonged iteration to get a machine leveled tends to promote compromised works of the two operators involved and thus increase the risk that the machine is not being optimally leveled to the required specification.

Third, unleveled machine would deform machine structure and affect machine surface plane flatness, cause dimension changes and incur additional machine structural vibration that result in the deterioration of machine accuracy performance. Traditional leveling instruments are not equipped with vibration diagnostic sensors to verify machine leveling positional stability when machine operator alignment task has completed. In particularly, if one footing of a machine is not taking its appropriate weight load during machine setup adjustment (i.e. when machine in static state is just touch on the ground), and when the machine is in operating state (i.e. during machine in dynamic state), induced vibration known as machine 'rocking' occurs. Machine structure tends to promote 'rocking' when fast-moving machine sub-unit driven by motors (such as milling head), generates inertia and the disposition weight shifts the center of gravity to a different location within the machine causing unstable machine positional stability.

Fourth, conventional angle calibration apparatus employs single-axis rotary plate and is unable to generate simultaneous 2-dimentional surface planar angle. Calibrating one axis at a time subjects the calibration system to inter-axis offset error when calibrating 2-axis angle measuring device. This offset error is the result of the first axis reference position has been displaced when removing the instrument for calibrating the second axis. It also increases calibration time due to multiple set up procedure on reference zero.

Accordingly, improved leveling devices and calibration apparatus are desired that address the forgoing shortcomings of current single-axis leveling devices and calibration apparatus.

SUMMARY OF INVENTION

One aspect of present invention is to provide a calibration routine consists of multiple steps for determining the sensor of angle measuring instrument in each X and Y axis for a 360° rotation with reference to earth datum using granite table and Master Square. According to an embodiment, a method and apparatus for calibrating of 2-axis precision planar angle measuring device. The method involves the initialization setting for a planar angle measuring device. Said planar angle is the resultant angle of XY planes. The apparatus consists of 2-axis rotary turning plates precisely leveled to earth datum, wherein one plate is assembled in perpendicular to the other plate and attached within a common frame, whereby each rotary plate is equipped with a turning motor to generate a series of planar resultant angles within 360° turning.

Another object of present invention is to provide an apparatus for a continuous routine in setting a 2-axis resultant planar angle within 360° rotation without the need to compensate the inter-axis reference angles on each X and Y planes.

A further object of present invention is to provide the instrument with vibration sensors to detect vibration magnitude and frequency, particularly advantageous to verify a leveled-machine structural stability performance.

Still another object of present invention is to provide a continuous procedure consisting a predefined multiple moving steps (such as zigzag movements) to excite vibration of a levelled machine while enabling the device to acquire the machine vibration amplitude and frequency patterns for accessing machine structure positional stability.

A further object of present invention is to provide the instrument with a wireless communication device to enable another device accessing the planar angles in real time, particularly advantageous when performing remote two-dimensional alignment tasks.

A further object of the present invention is to provide the device with an azimuth sensor to detect angular change, particularly advantageous when performing parallelism alignment tasks.

Tedious machine leveling and alignment tasks confronted by machine installation operators using conventional single-axis leveling devices encourage compromised works and thus exposing higher risk of having reduced machine accuracy performance during installation resulting in lower machined-part production yields. The advantage of the present invention is its simplification of planar surface leveling task results in faster machine leveling and alignment, improved accountability and significantly reduction of machine installation and setup cost.

A further object of the present invention is to provide a system and method for changing a measurement state of a digital level having an orientation sensor. The system and method includes detecting an orientation of the digital level through the orientation sensor and automatically activating a measurement mode of the digital level based on the orientation detected by the orientation sensor. The system and method may further include switching between multiple measurement modes based on different detected orientations of the digital level.

Other objects, features and advantages of the present invention would become apparent from the subsequent description and appended claims, taken in conjunction with the accompanying drawings.

BRIEF DESCRIPTION OF THE DRAWINGS

The details of the calibration method and apparatus will be understood more clearly with reference made to the accompanying drawings, in which.

DESCRIPTION OF PREFERRED EMBODIMENTS

The calibration method used for setting the 2-axis digital angle measuring instrument is to configure both X and Y sensors reference angular plane positions as shown in FIG. 1 to FIG. 9. The digital angle measuring instrument or device may include any of a variety of orientation sensors that may be disposed in the device, for example in one or more microelectromechanical systems (MEMS) chips or the like. For example, the orientation sensors may include vibration sensors for detecting vibration magnitude in X, Y and Z directions of the cartesian coordinate system, azimuth sensors for detecting angular position change in one or more directions or in parallelism measurements, weight or pressure sensors, or any other desired orientation sensors such as accelerometers or gyroscopes. According to FIG. 1, the 2-axis digital level 1 is preferably placed on a levelled granite table 2 and a granite master square 3 supported by a metal frame 4.

Figure 1:
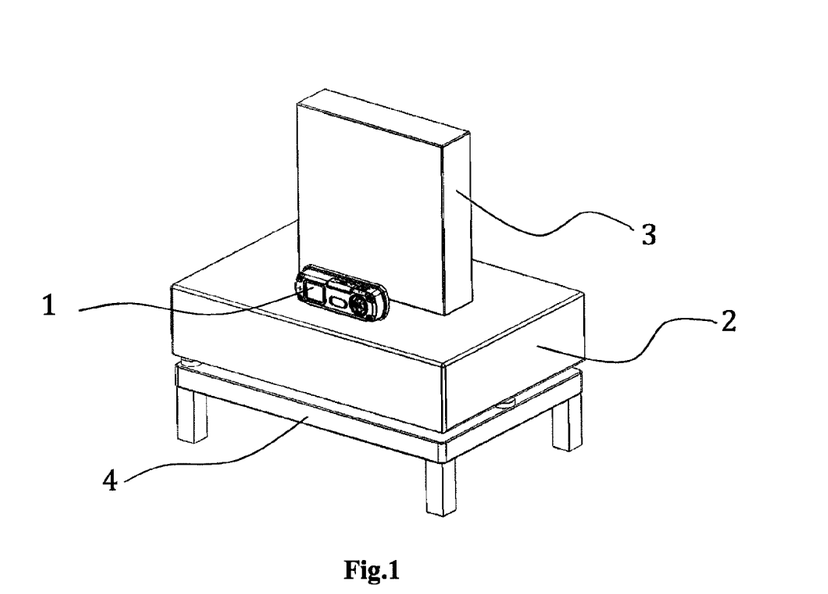
FIG. 1 is the calibration method shown the algorithm to configure the sensor reference angular positions.
Figure 2:
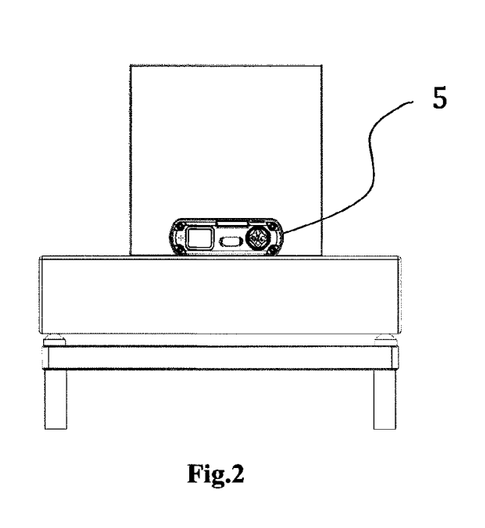
FIG. 2 to FIG. 9 are illustrations of calibration steps of an embodiment of 2-axis angle measuring device.
Figure 3:
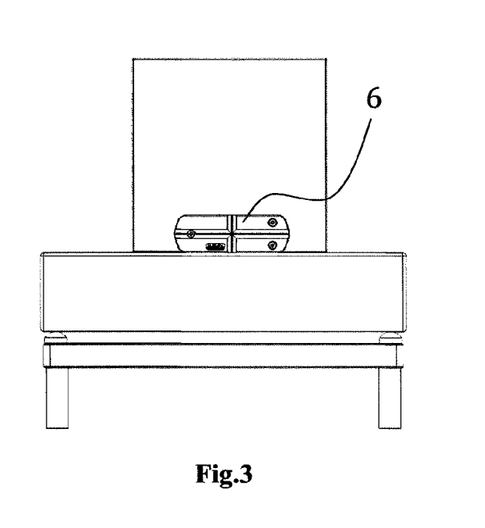
Figure 4:
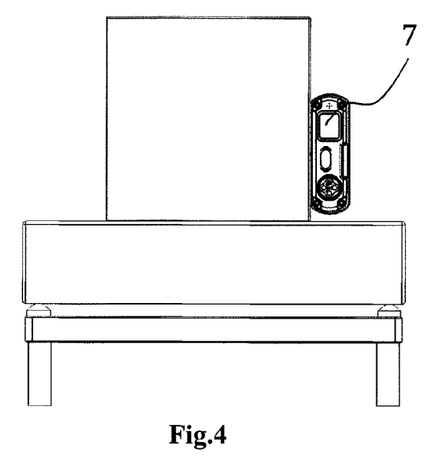
Figure 5:
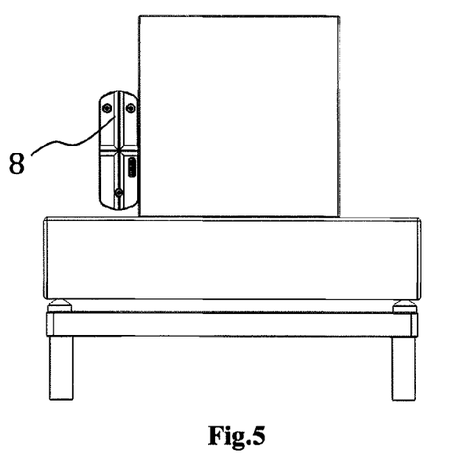

According to FIG. 2 to FIG. 9 illustrate each steps involved in setting sensor reference angular plane position for each of the two axis accordingly. FIG. 2 to FIG. 3 are illustrating the steps for setting X-sensor in horizontal front-position 5 and back-position 6 respectively, whereas FIG. 4 and FIG. 5 are steps for setting Y-sensor in vertical front-right position 7 and vertical back-left position 8 respectively.

Figure 6:
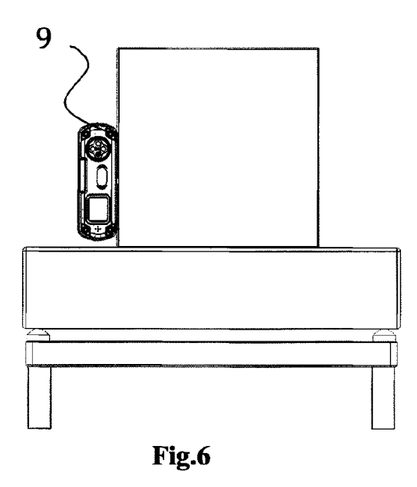
Figure 7:
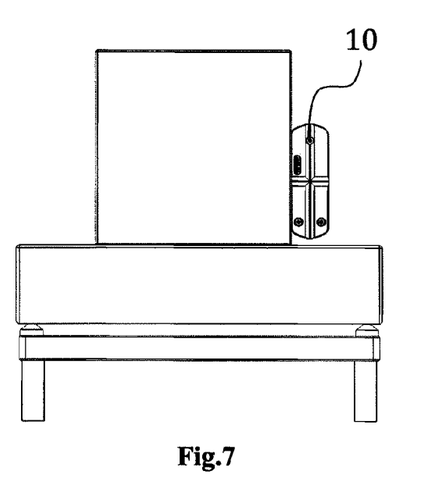

According to FIG. 6 to FIG. 7 are illustrating the steps involved for setting Y-sensor in vertical front-left position 9 and back-right position 10 respectively.

Figure 8:
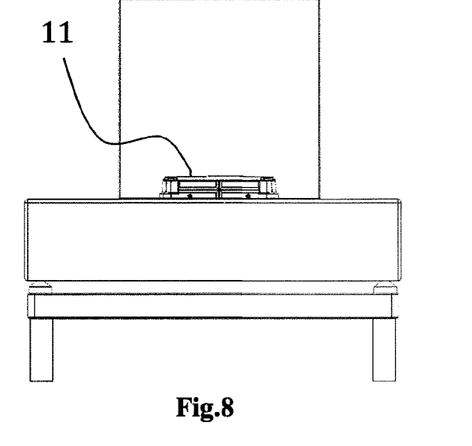
Figure 9:
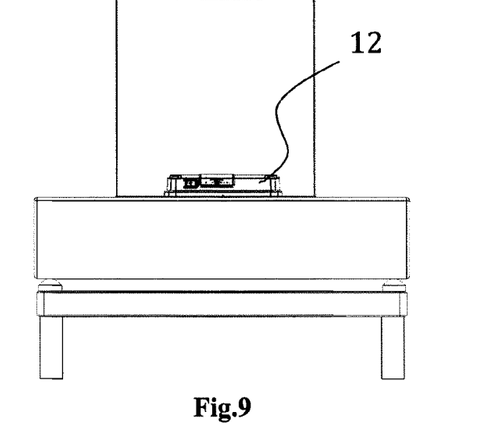
Figure 10:
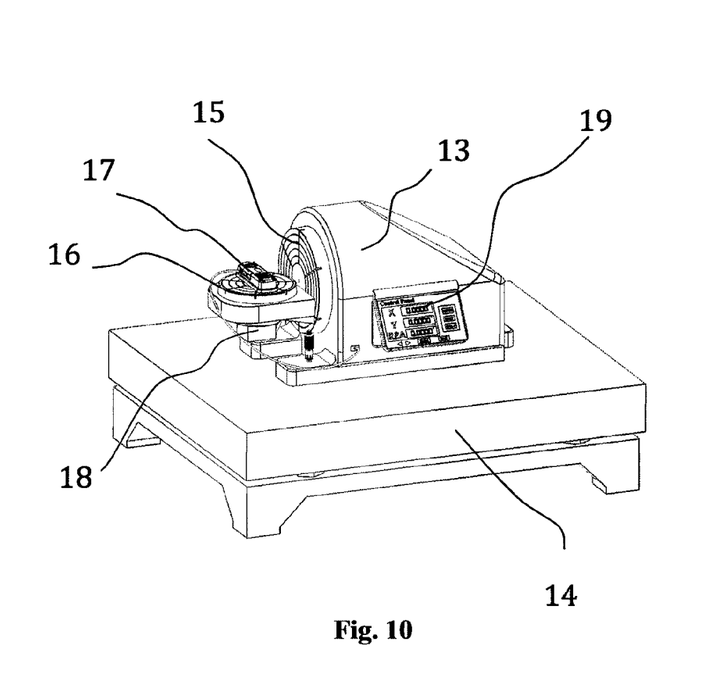
FIG. 10 is the front perspective view of one embodiment of a 2-axis rotary table for generating a planar angle in the present invention and the embodiment is placed on a granite table supported by a rectangular steel stand.

According to FIG. 8 to FIG. 9 are illustrating the steps involved for simultaneously setting XY-sensor in horizontal-front position 11 and horizontal-back position 12 respectively.

A significant feature of the calibration method according to the invention is the condition that both X and Y sensors configured independently for each vertical and horizontal direction of reference planes and the measured quantities are simultaneously integrated to form an inter-planar origin. The preferred arrangement removes inter-planar offset quantities at origin with reference to the earth datum by taking multiple reference planes in determining both horizontal and vertical planes.

An embodiment of a 2-axis rotary table apparatus can best be appreciated by referring to FIG. 10 to FIG. 14. According to FIG. 10, the apparatus consist of a frame 13 placed on top surface of a levelled granite table 14. The frame houses an X-axis rotary plate 15 precisely attached perpendicularly to a Y-axis rotary turning plate 16. A 2-axis digital levelling device 17 is attached on the top surface of the Y-axis rotary plate for calibration. The Y-axis rotary plate is driven by a precision motor 18 to generate an angle along the Y-axis direction. Similarly, the X-axis rotary plate is driven by another precision motor located in the frame 13 to generate an angle along the X-axis direction. Driving both motors in any specific direction and quantity by using the control panel 19 generates a precise two-dimensional angle of a plane within 360 degrees rotations. The planar angle generated is used to calibrate the 2-axis digital levelling device 17.

Figure 11:
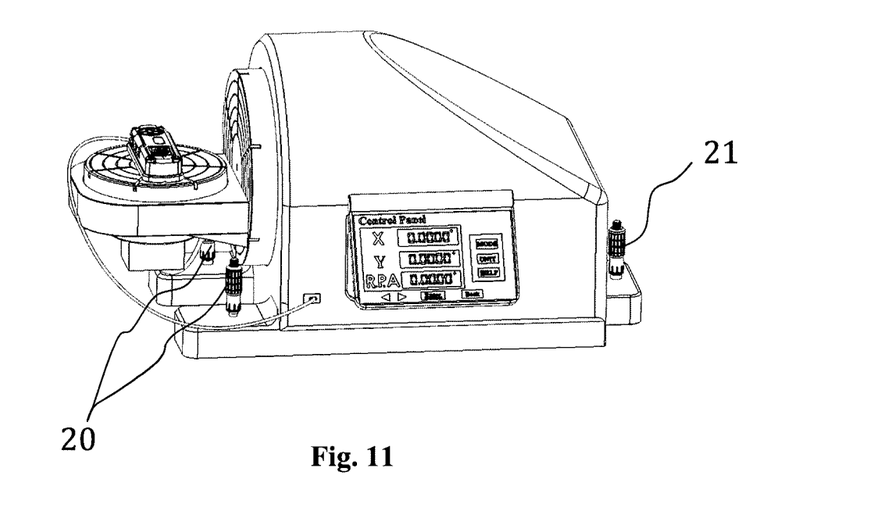
FIG. 11 is a front elevation view of one embodiment of the present invention showing a 2-axis angle measurement instrument is attached on Y-axis turn table and a control panel for operating the rotary table apparatus.
Figure 12:
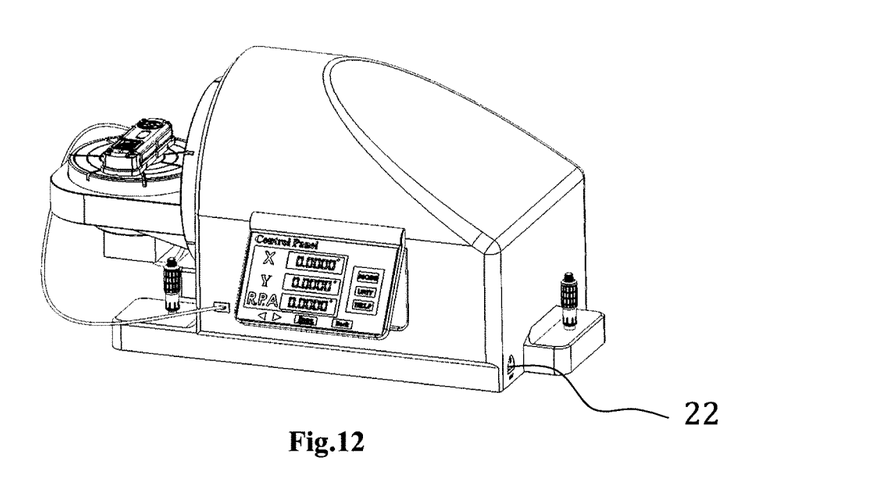
FIG. 12 is a back perspective view of the rotary table apparatus showing a precision footing adjustment micrometer mounted.
Figure 13:
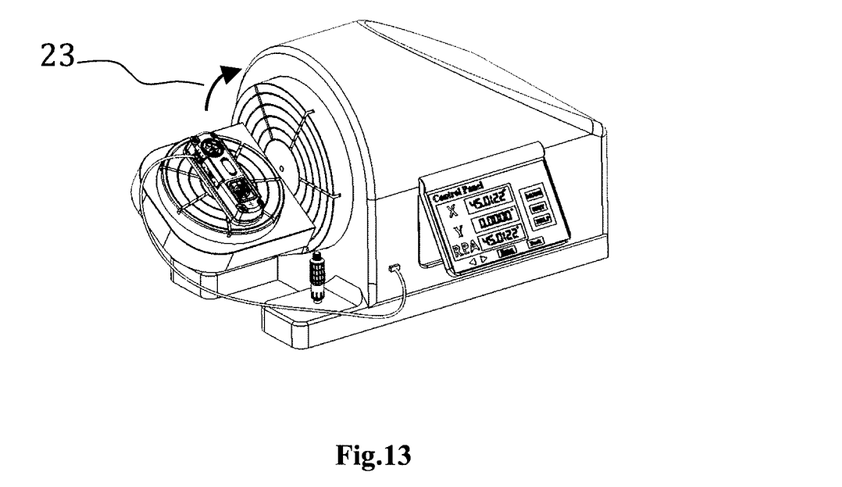
FIG. 13 is a side perspective view of preferred embodiment showing the X-Axis rotary table position is rotated at 45.0122° and the Y-Axis rotary plate position is at 0.0000° displayed by the control panel.

According to FIG. 11, two front-micrometer adjustment footings 20 and one back-micrometer adjustment footing 21 are used for initial setting on the 2-axis rotary table apparatus to attain a levelled X-Y plane with reference to earth datum. According to FIG. 12, the back view of the 2-axis rotary table apparatus showing the electrical power socket point 22. According to FIG. 13, the front view of the 2-axis rotary table apparatus showing the X-axis is rotated to an angle of +45.0122° with a positive direction 23 while the Y-Axis turn plate position is maintained at 0.0000°. This feature is used for generating a single X-axis independent to Y-axis.

Figure 14:
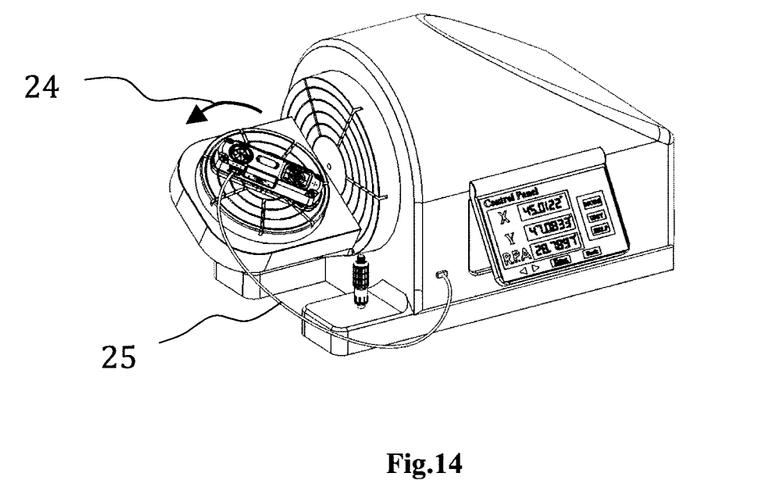
FIG. 14 is another side perspective view of preferred embodiment showing the X-Axis rotary table position is rotated at 45.0122° and the Y-Axis rotary plate position is at 47.0833° displayed by the control panel. The combination of XY-plane generates a novel resultant planar angle (RPA) of =28.7897°.

According to FIG. 14, the front view of the 2-axis rotary table apparatus showing the X-axis is rotated to an angle of +45.0122° while the Y-Axis turn plate position is set to an angle of +47.8331° with a positive direction 24 as shown in the control panel. This novel feature utilizes the X=+45.0122° and Y=+47.0833° to generate a combination XY-plane having a resultant planar angle of RPA=28.7897°. The resultant planar angle is fed to the device using cable 25 to compensate device sensor readings enabling auto calibration of the entire set of device readings over full 360°. Although communication between the device and the 2-axis rotary table apparatus is shown using cable 25, in some embodiments, the device may be in wireless communication with the 2-axis rotary table apparatus, for example, using Bluetooth, WiFi, a cellular data network, or any similar system for wireless communication, as should be understood by those skilled in the art.

A significant feature of the apparatus according to the invention is the apparatus ability to generate continuous XY plane of set angles within 360° rotational directions for calibrating a 2-axis digital angle measuring device. This simultaneous X and Y axis angles generating feature enables the calibration of a t-axis digital angle measuring device to be performed quickly, accurately and lower cost.

The method and apparatus for calibrating a 2-axis planar angle measuring device advantageously enables a machine installation operator to level a machine faster, reduces setup cost and enables the use of vibration diagnostics to enhance machine setup quality. The calibration apparatus advantageously ensures the simultaneous 2-axis angle measuring device is concurrently calibrated for both axis without the need to calibrate one axis at a time as experienced when using a current single-axis calibration apparatus.

Referring to FIG. 15A-15D, in an embodiment, the leveling device 17 may include a system for automatically transitioning the leveling device 17 between multiple measurement states. For instance, the leveling device 17 may automatically transition from a one-axis level mode, shown in FIG. 15B, to a two-axis level mode, shown in FIG. 15D, depending upon a detected orientation of the leveling device 17 as detected by the orientation sensors of the leveling device 17. In particular, when the leveling device 17 is in operation and the orientation sensors detect that the leveling device 17 is in a first orientation for single axis leveling, relative to a surface 28, shown in FIG. 15A, the leveling device 17 automatically displays the one-axis leveling mode 29, shown in FIG. 15B, on a display 30. In the one-axis leveling mode 29, shown in FIG. 15B, the leveling device 17 operates to detect angular orientation along a single axis to level in a single axis measurement plane and displays leveling data on the display 30, shown in FIG. 15B, in the single axis measurement plane.

Figure 15A:
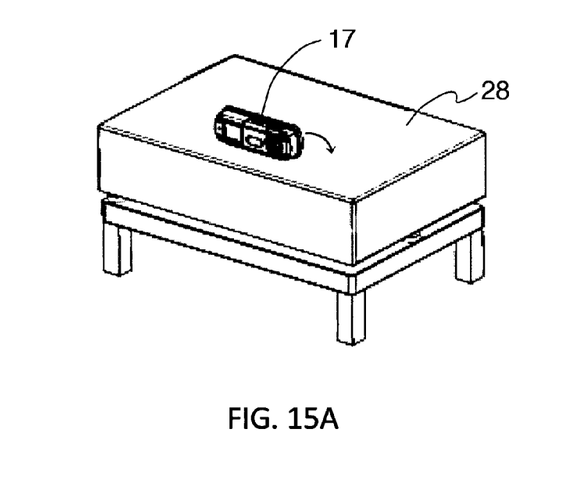
FIG. 15A is a front perspective view of a leveling device in a single-axis leveling orientation.
Figure 15B:
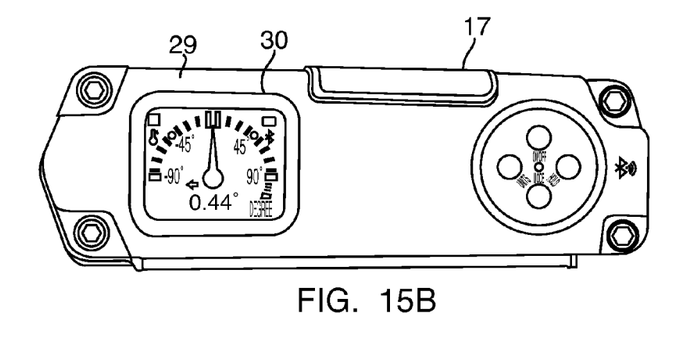
FIG. 15B is a front view of the leveling device of FIG. 15A in the single-axis leveling orientation.
Figure 15C:
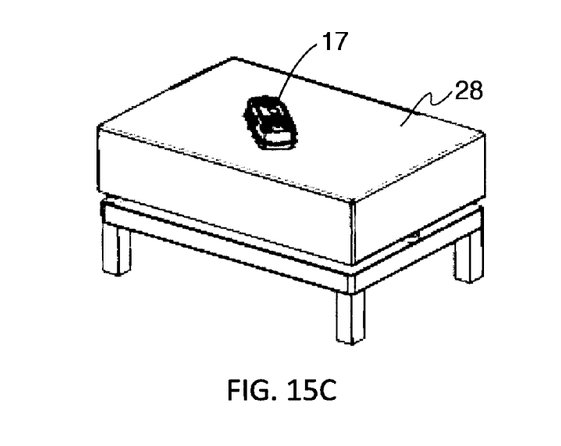
FIG. 15C is a front perspective view of the leveling device of FIG. 15A in a two-axis leveling orientation.
Figure 15D:
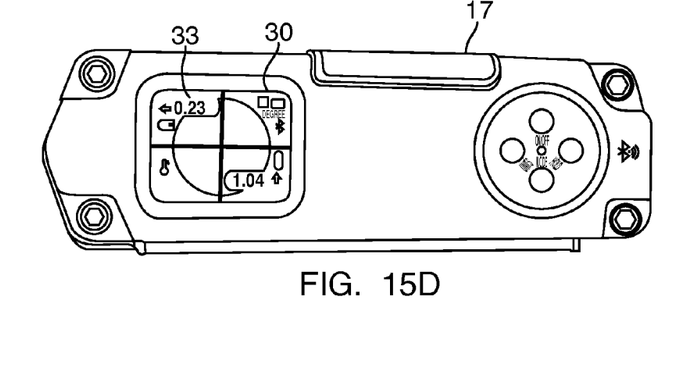
FIG. 15D is a front view of the leveling device of FIG. 15C in the two-axis leveling orientation.

If a user then rotates the leveling device 17 relative to the surface 28, as shown by arrow 32 of FIG. 15A, from the first orientation for single axis leveling, shown in FIG. 15A, to a second orientation for two-axis leveling, shown in FIG. 15C, the leveling device 17 automatically displays the two-axis leveling mode 33, shown in FIG. 15D, on the display 30. In the two-axis leveling mode 33, shown in FIG. 15D, the leveling device 17 operates to detect angular orientation along two orthogonal axes to level in a dual axis measurement plane and displays leveling data on the display 30, shown in FIG. 15D, in the dual axis measurement plane. Similarly, if the user rotates the leveling device 17 from the second orientation for two-axis leveling, shown in FIG. 15C, to the first orientation for single axis leveling, shown in FIG. 15A, the leveling device 17 automatically transitions back to display the one-axis leveling mode 29, shown in FIG. 15B, on the display 30.

Thus, the leveling device 17 may advantageously automatically transition from the one-axis leveling mode 29, shown in FIG. 15B, to the two-axis leveling mode 33, shown in FIG. 15D, and vice versa, based on the orientation of the leveling device 17 as detected by the orientation sensors of the leveling device 17. This allows the user to seamlessly transition the leveling device 17 between level modes, as desired, by only changing the orientation of the leveling device 17 and without requiring further input from the user (e.g. through a button, switch or the like). The first and second orientations may advantageously be predefined or preset orientations of the leveling device 17 that are programmed into the leveling device 17.

The leveling device 17 has the necessary electronics, software, memory, storage, databases, firmware, logic/state machines, microprocessors, communication links, displays or other visual or audio user interfaces, and any other input/output interfaces to perform the functions described herein and to achieve the results described herein. For example, the leveling device 17 may include a processor and memory, which may include system memory, including random access memory (RAM) and read-only memory (ROM). The leveling device 17 may be connected to one or more external devices through wired or wireless communication, as discussed above. Suitable computer program code may be provided for executing numerous functions, including those discussed herein in connection with the system for automatically transitioning the leveling device 17 from a one-axis level mode to a 2-axis level mode.

The leveling device 17 may include one or more conventional microprocessors and one or more supplementary co-processors such as math co-processors or the like. The one or more conventional microprocessors may be in communication with device memory, which may comprise an appropriate combination of magnetic, optical and/or semiconductor memory, and may include, for example, RAM and ROM. The processors and the device memory each may be, for example, located entirely within leveling device 17.

The device memory may store, for example, one or more databases and other information required by the leveling device 17, an operating system for the leveling device 17, and one or more other programs (e.g., computer program code and/or a computer program product) adapted to direct the one or more processors to provide the leveling device 17 with the various attributes discussed herein. The operating system and/or other programs may be stored, for example, in a compressed, an uncompiled and/or an encrypted format, and may include computer program code. The instructions of the computer program code may be read into a main memory of one or more processors from the memory. While execution of sequences of instructions in the program causes the one or more processors to perform the process steps described herein, hard-wired circuitry may be used in place of, or in combination with, software instructions for implementation of the processes of the present invention. Thus, embodiments of the present invention are not limited to any specific combination of hardware and software.

The programs discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing the leveling device 17 with the system for automatically transitioning the leveling device 17 from a one-axis level mode to a 2-axis level mode. In an embodiment, an application of executable code may be a compilation of many instructions, and may even be distributed over several different code partitions or segments, and among different programs.

The term "computer-readable medium" as used herein refers to any medium that provides or participates in providing instructions to one or more processors of the leveling device 17 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Various forms of computer readable media may be involved in carrying one or more sequences of one or more instructions to the one or more processors of the leveling device 17 (or any other processor of a device described herein) for execution.

In operation, the leveling device 17 may be calibrated and used according to the various embodiments described herein. For instance, the leveling device 17 may be operated in the one-axis leveling mode 29, shown in FIG. 15B, the two-axis leveling mode 33, shown in FIG. 15D, and may be seamlessly transitioned between the leveling modes as discussed above.

The invention has been described with reference to the illustrated preferred embodiments. The invention is not unduly limited by this disclosure of the preferred embodiment described, instead it is intended that the invention be defined as their equivalents, set forth in the following claims.

What is claimed is:

1. A calibration method for simultaneous 2-axis angle measuring device used for leveling and alignment of precision machines and equipment, the said method comprising:
   setting a levelled position of a granite table and/or a granite Master Square;
   initializing X-sensor reference levelling plane position to granite table position in horizontal front-position and back-position;
   initializing Y-sensor reference in vertical plane to front-right position and vertical plane back-left position;
   initializing Y-sensor reference in vertical plane front-left position and vertical back-right position;
   simultaneously initializing XY-sensors reference planes in both horizontal-front position and horizontal-back position;
   initializing and setting the reference leveling planes of all sensors to earth datum.

2. The method of claim 1 wherein the steps of calibrating the measuring device sensors includes:
   a 2-axis rotary table planar angle generating apparatus comprising an electronic system unit;
   a mechanical frame; and
   an X-axis rotary plate and a Y-axis rotary plate attached precisely in tangent to form an unitary embodiment;
   wherein each X and Y rotary plates are driven by a motor for generating simultaneous two-dimensional angles of 360° at high precision; and
   wherein the surface of Y-axis rotary plate of the said mechanical frame is leveled by three micrometer adjustment footings to earth datum.

3. The method of claim 2 wherein the 2-axis rotary table apparatus further includes the steps of:
   initializing the levelled granite table using the micrometer adjustment footings to attain a levelled X-Y plane with reference to earth datum;
   retrieving device sensors reading in consecutive sets of planar angles from the device;
   calculate to generate the resultant planar angle to validate device sensor readings;
   determine valid readings and auto updating the compensated readings until a full cycle of 360° for the entire series of XY planes.

4. The method of claim 3 wherein the steps of calibrating the measuring device sensors to include vibration sensors for detecting measuring object's vibration magnitude and frequency in X, Y and Z directions.

5. The method of claim 3 wherein the steps of calibrating the measuring device sensors to include object's vibration consisting predefined sets of repetitive movement steps including zigzag movements, to excite object vibration and acquire the object vibration amplitude and frequency patterns for accessing object structure positional stability.

6. The method of claim 3 wherein the steps of calibrating the measuring device sensors to include azimuth sensors for detecting angular position change in parallelism measurements.

7. The method of claim 3 wherein the steps of calibrating the measuring device sensors to include a wireless communication device to enable another device accessing and recording planar angles in real time.

8. The method of claim 3 wherein the steps of calibrating the measuring device sensors to include weight and pressure sensors attach to object footings to assess the state of levelled object wherein each footing is taking its proportionate weight in accordance with the object structure.

9. A method for changing a measurement state of an angular measuring device having a 2-axis MEMS tilt sensor, the method comprising:
   detecting a 2-dimensional digital angular position of the angular measuring device through the 2 axis MEMS tilt sensor;
   activating, automatically, a first measurement mode of the angular measuring device when the angular position detected by the 2 axis MEMS tilt sensor is equal to a first angular position; and
   activating, automatically, a second measurement mode of the angular measuring device when the angular position detected by the 2 axis MEMS tilt sensor is equal to a second angular position.

10. The method according to claim 9, wherein the first angular position is a first predefined angular position defining a single axis measurement plane.

11. The method according to claim 10, wherein the first measurement mode is a one-axis measurement mode.

12. The method according to claim 10, wherein the second angular position is a second predefined angular position defining a dual axis measurement plane.

13. The method according to claim 12, wherein the second measurement mode is a two-axis measurement mode.

14. The method according to claim 9, wherein the 2 axis MEMS tilt sensor includes at least one azimuth sensor for detecting angular position changes.

15. An angular measuring device comprising:
a 2-axis MEMS tilt sensor adapted to detect a 2-dimensional digital angular position of the angular measuring device;
a display adapted to display angular position data; and
a processor in communication with the 2 axis MEMS tilt sensor and the display, the processor receiving a signal from the 2 axis MEMS tilt sensor indicative of an angular position of the angular measuring device and automatically operating in a predefined measurement mode based on the 2-dimensional digital angular position of the angular measuring device.

16. The angular measuring device according to claim 15, wherein the processor operates in a one-axis measurement mode when the leveling device is in a first predefined angular position and operates in two-axis measurement mode when the leveling device is in a second predefined angular position.

17. The angular measuring device according to claim 16, wherein the first angular position defines a single axis measurement plane.

18. The angular measuring device according to claim 17, wherein the second angular position defines a dual axis measurement plane.

19. The angular measuring device according to claim 18, wherein the display is adapted to automatically display angular position data in the single axis measurement plane when the angular measuring device is in the first predefined angular position and in the dual axis measurement plane when the angular measuring device is in the second predefined orientation.

20. The angular measuring device according to claim 19, wherein the 2 axis MEMS tilt sensor includes at least one azimuth sensor for detecting angular position changes.

* * * * *